United States Patent [19]
Choi et al.

[11] Patent Number: 5,781,553
[45] Date of Patent: Jul. 14, 1998

[54] DIGITAL WIRELESS PRIVATE BRANCH EXCHANGE SYSTEM

[75] Inventors: Sang-jun Choi; Sung-tae Choi, both of Kyunggi-do, Rep. of Korea

[73] Assignee: LG Information & Communications, Ltd., Seoul, Rep. of Korea

[21] Appl. No.: 579,686

[22] Filed: Dec. 28, 1995

[30] Foreign Application Priority Data

Dec. 30, 1994 [KR] Rep. of Korea ............... 94-39444
Dec. 30, 1994 [KR] Rep. of Korea ............... 94-39455
Nov. 30, 1995 [JP] Japan ............................. 95-45902

[51] Int. Cl.⁶ .................................................. H04J 13/02
[52] U.S. Cl. .......................... 370/464; 370/342; 375/200
[58] Field of Search ............................. 370/464, 493,
370/494, 495, 496, 498, 503, 344, 310,
314, 320, 321, 324, 325, 335, 343, 342,
350, 441, 442, 479, 535; 375/355, 356,
200, 205, 242, 241, 298, 329; 379/93.09,
93.11, 93.15, 231, 232; 455/5.1, 554, 555,
556, 560, 561, 422, 38.1

[56] References Cited

U.S. PATENT DOCUMENTS 5,590,406  12/1996  Bayley et al. ...................... 370/493
5,638,363  6/1997  Gittins et al. ....................... 370/493

*Primary Examiner*—Dang Ton
*Attorney, Agent, or Firm*—Jacobson, Price, Holman & Stern, PLLC

[57] ABSTRACT

A digital wireless private branch exchange system comprising a system body, a terminal device and a base station controller. The base station comprises an RF unit for modulating an analog IF signal to convert it into an RF signal, transmitting the resultant RF signal to the terminal device through a radio channel, receiving an RF signal from the terminal device through the radio channel, demodulating the received RF signal to convert it into an analog IF signal and transferring the resultant analog IF signal, an IF processor for converting a plurality of first frames with voice data and control data into an analog IF signal, transferring the resultant analog IF signal to the RF unit and distributing the analog IF signal from the RF unit, a base station controller for transmitting and receiving voice data and control data to/from the system body, and a plurality of channel controllers, each of the channel controllers forming the voice data and control data from the base station controller into the first frame, transferring the formed first frame to the IF processor, extracting a second frame from the analog IF signal distributed from the IF processor, separating the extracted second frame into voice data and control data and transferring the separated voice data and control data to the base station controller.

14 Claims, 11 Drawing Sheets

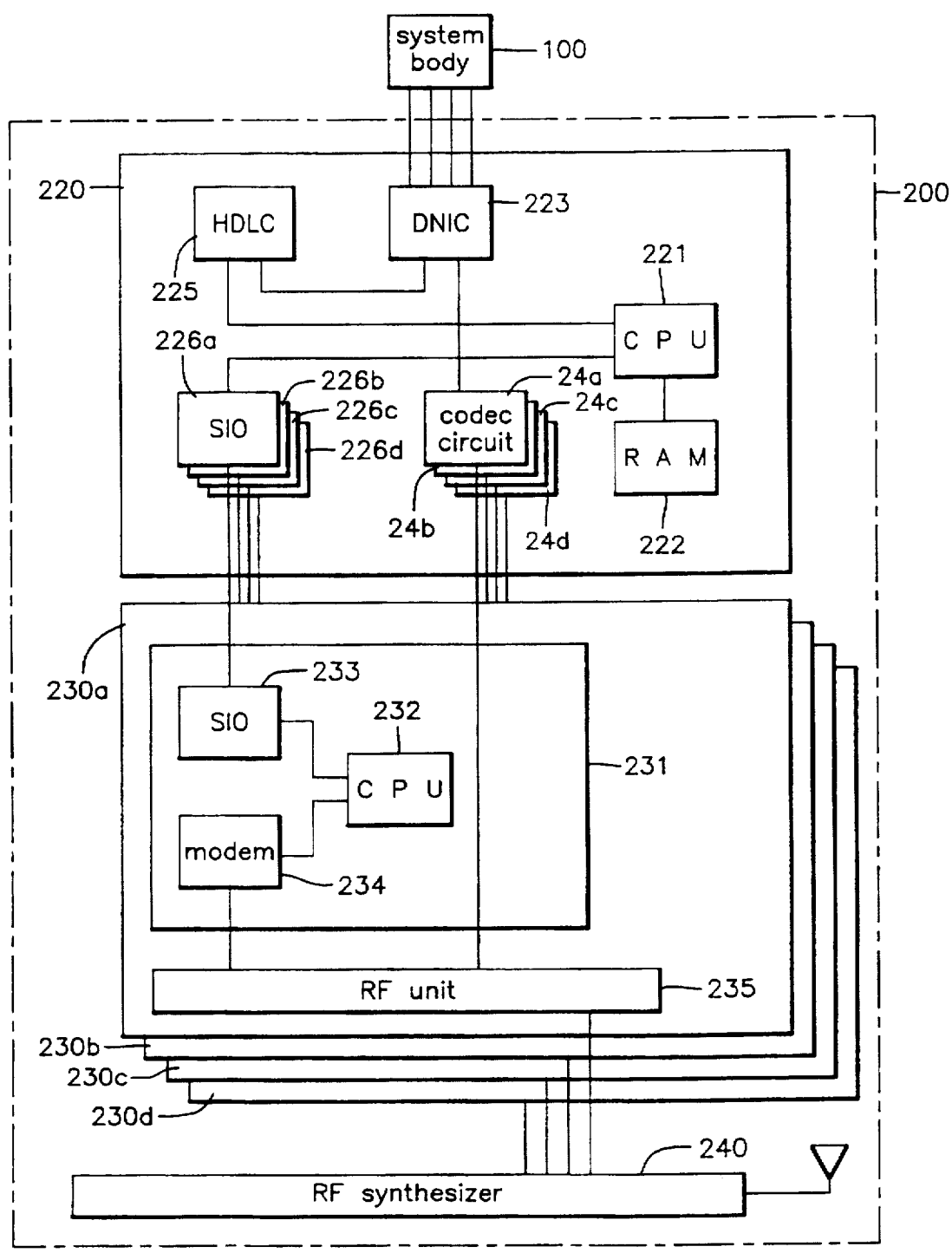
FIG. 1

X: preamble or control data preamble
control data

X: preamble or control data
B: voice data

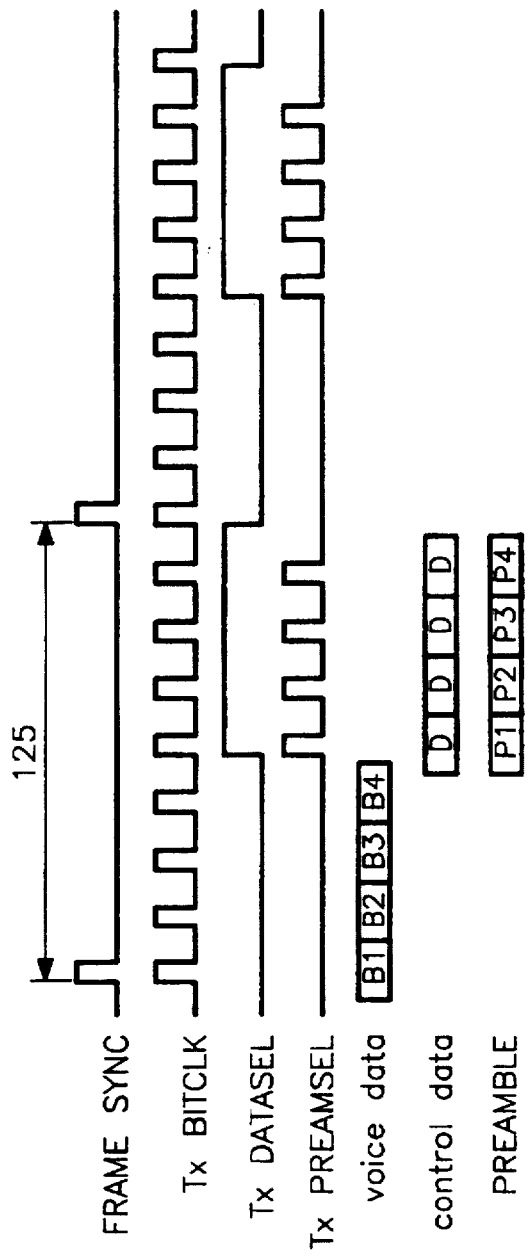

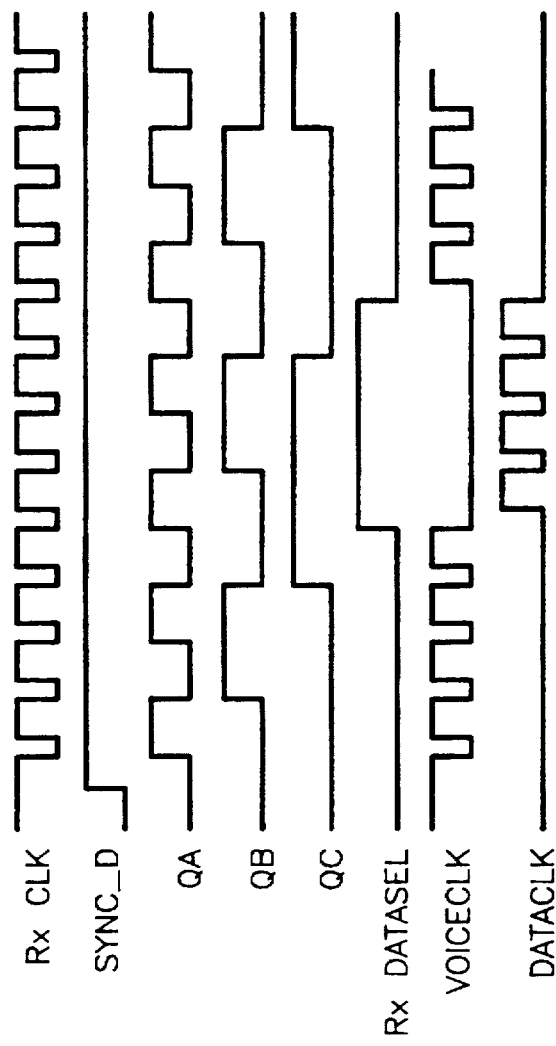

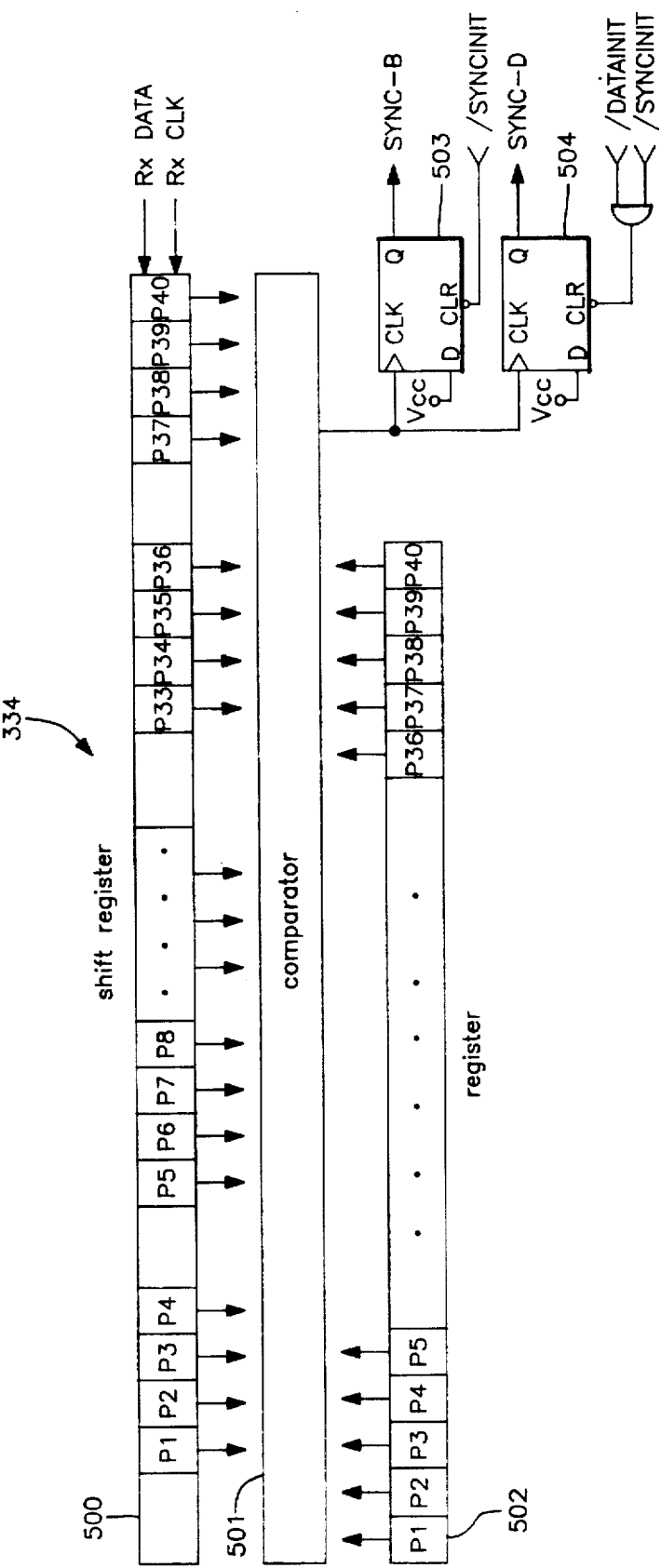

DIGITAL WIRELESS PRIVATE BRANCH EXCHANGE SYSTEM

BACKGROUND OF THE INVENTION

1. Field of the Invention

The present invention relates in general to digital wireless private branch exchange systems using a code division multiple access (referred to hereinafter as CDMA) manner, and more particularly to a digital wireless private branch exchange (referred to hereinafter as PBX) system for performing the simultaneous transmission and reception of voice data and control data between a base station and a terminal device to provide good telephone conversation service.

2. Description of the Prior Art

Referring to FIG. 1, there is shown a block diagram of a conventional wireless PBX system. As shown in this drawing, the conventional wireless PBX system comprises a system body 100, a base station 200 and a terminal device 120. The system body 100 transmits and receives voice data and control data with pulse code modulation (referred to hereinafter as PCM) data formats to/from the base station 200 through 2B+D channels, in which 2B indicates two B channels and D indicates one D channel. The voice data is transmitted and received through the 2B channels and the control data is transmitted and received through the D channel. The base station 200 receives the voice data and control data from the system body 100 and transmits the received voice data and control data individually to the terminal device 120 through a radio channel. Also, the base station 200 receives voice data and control data from the terminal device 120 individually through the radio channel and transmits the received voice data and control data to the system body 100. To this end, the base station 200 comprises a base station controller 220, a plurality of base station transmission/reception units 230a–230d and a radio frequency (referred to hereinafter as RF) synthesizer 240. The base station controller 220 includes a central processing unit (referred to hereinafter as CPU) 221, a random access memory (referred to hereinafter as RAM) 222, a digital network interface circuit (referred to hereinafter as DNIC) 223, a plurality of codec circuits 224a–224d, a high level data link control (referred to hereinafter as HDLC) unit 225 and a plurality of serial input/output (referred to hereinafter as SIO) units 226a–226d. Each of the base station transmission/reception units 230a–230d includes an RF controller 231 and an RF unit 235. The RF controller 231 includes a CPU 232, an SIO unit 233 and a modem 234.

In the base station controller 220, the DNIC 223 transmits and receives the voice data and control data to/from the system body 100 through the 2B+D channels. Namely, the DNIC 223 receives the voice data from the system body 100 and transfers the received voice data to the codec circuits 224a–224d. Also, the DNIC 223 receives the control data from the system body 100 and transfers the received control data to the HDLC unit 225. The DNIC 223 further receives voice data from the codec circuits 224a–224d and transmits the received voice data to the system body 100. The DNIC 223 further receives control data from the HDLC unit 225 and transmits the received control data to the system body 100. The HDLC unit 225 processes the control data from the DNIC 223 and outputs the processed control data to the CPU 221. The HDLC unit 225 also processes control data from the CPU 221 and outputs the processed control data to the DNIC 223. The CPU 221 sequentially stores the control data from the HDLC unit 225 into the RAM 222 and then outputs the stored data to the SIO units 226a–226d. Also, the CPU 221 sequentially stores control data from the SIO units 226a–226d into the RAM 222 and then outputs the stored data to the HDLC unit 225. Each of the codec circuits 224a–224d converts the voice data from the DNIC 223 into an analog voice signal and transfers the resultant analog voice signal to the RF unit 235 in a corresponding one of the base station transmission/reception units 230a–230d through the RF controller 231 therein. Also, each of the codec circuits 224a–224d receives an analog voice signal from the RF unit 235 through the RF controller 231. Each of the codec circuits 224a–224d converts the received analog voice signal into digital voice data and then outputs the resultant voice data to the DNIC 223. Each of the SIO units 226a–226d receives the control data from the CPU 221 and transfers the received control data to the SIO unit 233 in the RF controller 231 in a corresponding one of the base station transmission/reception units 230a–230d. Also, each of the SIO units 226a–226d receives control data from the SIO unit 233 in the RF controller 231 and transfers the received control data to the CPU 221.

In each RF controller 231 of the base station transmission/reception units 230a–230d, the SIO unit 233 receives the control data from a corresponding one of the SIO units 226a–226d in the base station controller 220 and transfers the received control data to the CPU 232. Also, the SIO unit 233 receives control data from the CPU 232 and transfers the received control data to the corresponding one of the SIO units 226a–226d. The CPU 232 reads the control data from the SIO unit 233 and outputs the read control data to the modem 234. Also, the CPU 232 reads control data from the modem 234 and outputs the read control data to the SIO unit 233. The modem 234 performs a minimum shift keying (referred to hereinafter as MSK) modulation operation for the control data from the CPU 232. The modem 234 then transfers the MSK-modulated signal to the RF unit 235. Also, the modem 234 MSK-demodulates an output signal from the RF unit 235 to extract control data therefrom. The modem 234 then transfers the extracted control data to the CPU 232. The RF unit 235 receives the analog voice signal from a corresponding one of the codec circuits 224a–224d in the base station controller 220 and the MSK-modulated signal from the modem 234. Then, the RF unit 235 converts the received signals into an RF signal and transfers the resultant RF signal to the RF synthesizer 240. The RF unit 235 also extracts an analog voice signal and an MSK-modulated signal from an RF signal from the RF synthesizer 240. Then, the RF unit 235 transfers the extracted analog voice signal to the corresponding one of the codec circuits 224a–224d through the RF controller 231. The RF unit 235 also transfers the extracted MSK-modulated signal to the modem 234. The RF synthesizer 240 collects the RF signals from the RF units 235 in the base station transmission/reception units 230a–230d and transmits the resultant RF signal to the terminal device 120 through the radio channel. The RF synthesizer 240 also receives an RF signal from the terminal device 120 through the radio channel and distributes the received RF signal to a corresponding one of the RF units 235 in the base station transmission/reception units 230a–230d.

However, the above-mentioned conventional wireless PBX system has a disadvantage in that the voice signal and the MSK-modulated control data cannot simultaneously be transmitted and received between the RF unit 235 and the terminal device 120 through the radio channel. Namely, the voice signal and the MSK-modulated control data must individually be transmitted and received between the RF unit 235 and the terminal device 120 through the radio channel. For this reason, in order to transmit and receive the control data in the middle of transmitting and receiving the voice signal between the RF unit 235 and the terminal device 120 to advance a telephone conversation, the transmission and reception of the voice signal must be suspended. When the transmission and reception of the voice signal are suspended for transmitting and receiving the control data, a noise is transferred to the user through the terminal device 120, resulting in a degradation in the quality of telephone conversation. Further, while the RF unit 235 communicates with the terminal device 120 through the radio channel, it has to check which of the voice signal and the control data has been received. As a result, transmission and reception operations cannot rapidly be performed.

SUMMARY OF THE INVENTION

Therefore, the present invention has been made in view of the above problems, and it is an object of the present invention to provide a digital wireless PBX system for performing the simultaneous transmission and reception of voice data and control data between a base station and a terminal device to provide good telephone conversation service and to enhance the transmission and reception operation speed.

In accordance with the present invention, the above and other objects can be accomplished by a provision of a digital wireless private branch exchange system comprising a system body for transmitting and receiving voice data and control data with pulse code modulation data formats, a terminal device for transmitting and receiving a radio frequency signal through a radio channel and a base station for converting the voice data and control data from the system body into a radio frequency signal, transmitting the resultant radio frequency signal to the terminal device through the radio channel, receiving the radio frequency signal from the terminal device through the radio channel, extracting voice data and control data from the received radio frequency signal and transmitting the extracted voice data and control data to the system body, wherein the base station comprises radio frequency transmission/reception means for modulating an analog intermediate frequency signal to convert it into a radio frequency signal, transmitting the resultant radio frequency signal to the terminal device through the radio channel, receiving the radio frequency signal from the terminal device through the radio channel, demodulating the received radio frequency signal to convert it into an analog intermediate frequency signal and transferring the resultant analog intermediate frequency signal; intermediate frequency processing means for converting a plurality of first frames with voice data and control data into an analog intermediate frequency signal, transferring the resultant analog intermediate frequency signal to the radio frequency transmission/reception means and distributing the analog intermediate frequency signal from the radio frequency transmission/reception means; base station control means for transmitting and receiving voice data and control data to/from the system body; and a plurality of channel control means, each of the channel control means forming the voice data and control data from the base station control means into the first frame, transferring the formed first frame to the intermediate frequency processing means, extracting a second frame from the analog intermediate frequency signal distributed from the intermediate frequency processing means, separating the extracted second frame into voice data and control data and transferring the separated voice data and control data to the base station control means.

The base station control means includes a digital network interface circuit for receiving the voice data and control data from the system body, separately outputting the received voice data and the received control data and simultaneously transmitting the voice data and control data from the base station control means to the system body; a central processing unit for sequentially storing the control data from the digital network interface circuit into a first-in-first-out memory and then outputting the stored control data; a high level data link control unit for processing the control data from the digital network interface circuit, outputting the processed control data to the central processing unit, processing the control data from the central processing unit and outputting the processed control data to the digital network interface circuit; a plurality of adaptive differential pulse code modulation circuits, each of the adaptive differential pulse code modulation circuits performing an adaptive differential pulse code modulation operation for the voice data from the digital network interface circuit, transferring the resultant voice data to a corresponding one of the channel control means, performing an adaptive differential pulse code demodulation operation for the voice data from the corresponding channel control means and outputting the resultant voice data to the digital network interface circuit; a plurality of serial input/output units, each of the serial input/output units transferring the control data from the central processing unit to the corresponding channel control means and transferring the control data from the corresponding channel control means to the central processing unit; and a clock generator for generating a clock signal and supplying the generated clock signal to the central processing unit, the adaptive differential pulse code modulation circuits, the serial input/output units, the channel control means and the intermediate frequency processing means.

Each of the channel control means includes a central processing unit for sequentially storing the control data from the base station control means into a first-in-first-out memory, outputting the stored control data and controlling a synchronous signal detection operation; a serial input/output unit for transferring the control data from the base station control means to the central processing unit and transferring the control data from the central processing unit to the base station control means; a data processing unit for forming the voice data from the base station control means and the control data from the central processing unit into the first frame, separating the second frame into voice data and control data and transferring the separated voice data to the base station control means and the separated control data to the central processing unit, respectively; a synchronization detector for detecting first and second synchronous signals from the second frame, outputting the detected first and second synchronous signals to the data processing unit and resetting the synchronous signal detection operation under the control of the central processing unit; an encoder/decoder circuit for encoding data in the first frame from the data processing unit for error correction, outputting the resultant first frame, decoding data in the second frame and outputting the resultant second frame to the synchronization detector and the data processing unit; a base band modem for spreading data in the first frame from the encoder/decoder circuit with a code division multiple access pseudo noise code, transferring the resultant first frame to the intermediate frequency processing means, performing a quadrature phase shift keying demodulation operation for digital intermediate frequency signals to extracting the second frame therefrom, despreading the code division multiple access pseudo noise code from the extracted second frame and outputting the resultant second frame to the encoder/decoder circuit; an amplification/phase shift circuit for amplifying the analog intermediate frequency signal from the intermediate frequency processing means and shifting a phase of the amplified signal by first and second angles; and a plurality of analog/digital converters for converting the phase-shifted analog intermediate frequency signals from the amplification/phase shift circuit into digital intermediate frequency signals and supplying the resultant digital intermediate frequency signals to the base band modem, respectively.

The data processing unit includes a transmission voice data processor for receiving the voice data from the base station control means and extending lengths of bits of the received voice data; a transmission control data processor for outputting a first interrupt signal to the central processing unit and processing the control data from the central processing unit in response to a transmission preamble signal and a first interrupt acknowledge signal from the central processing unit to change the bits number thereof; a data synthesizer for forming voice data from the transmission voice data processor and control data from the transmission control data processor into the first frame and supplying the formed first frame to the encoder/decoder circuit; a data separator for receiving the second synchronous signal from the synchronization detector and a reception clock signal and the second frame from the encoder/decoder circuit, separating the received second frame into control data and voice data and generating a reception data selection signal, a control data clock signal and a voice data clock signal; a reception voice data processor for processing the voice data from the data separator in response to the voice data clock signal from the data separator and the first synchronous signal from the synchronization detector to change the bits number thereof and transferring the resultant voice data to the base station control means; and a reception control data processor for receiving the control data, control data clock signal and reception data selection signal from the data separator and a second interrupt acknowledge signal from the central processing unit, outputting a second interrupt signal to the central processing unit, changing the bits number of the received control data and supplying the resultant control data to the central processing unit.

The transmission control data processor includes a buffer for storing the control data from the central processing unit therein; a register for storing the control data from the buffer in a parallel manner therein in response to a write control signal from the central processing unit and outputting the stored control data in a serial manner to the encoder/decoder circuit in response to a transmission clock signal; an AND gate for ANDing a transmission data selection signal and a transmission preamble selection signal; a counter for performing a counting operation in response to the first interrupt acknowledge signal from the central processing unit and the transmission clock signal to output the first interrupt signal to the central processing unit at a desired period; and a multiplexer for selecting one of the transmission data selection signal and an output signal from the AND gate in response to the transmission preamble signal and supplying the selected signal as the transmission clock signal to the register and the counter.

The data separator includes a counter for performing a counting operation in response to the reception clock signal from the encoder/decoder circuit to generate a plurality of clocks; an inverter for inverting the reception clock signal from the encoder/decoder circuit; a D flip-flop for generating the reception data selection signal in response to the second synchronous signal from the synchronization detector, a desired one of the clocks from the counter and the inverted reception clock signal from the inverter; a first demultiplexer for separating the second frame from the encoder/decoder circuit into control data and voice data in response to the reception data selection signal from the D flip-flop; and a second demultiplexer for separating the reception clock signal from the encoder/decoder circuit into the voice data clock signal and the control data clock signal in response to the reception data selection signal from the D flip-flop.

The reception control data processor includes a register for transferring the control data from the data separator in response to the control data clock signal from the data separator; a logic circuit including a plurality of AND gates and an OR gate, the logic circuit performing a logical operation for the control data from the register; an inverter for inverting the reception data selection signal from the data separator; a shift register for receiving control data from the logic circuit in a serial manner and outputting the received control data in a parallel manner in response to the inverted reception data selection signal from the inverter; a buffer for supplying the control data from the shift register to the central processing unit; a counter for performing a counting operation in response to the reception data selection signal from the data separator to generate a plurality of clocks; and a D flip-flop for generating the second interrupt signal in response to a desired one of the clocks from the counter and the second interrupt acknowledge signal from the central processing unit and outputting the generated second interrupt signal to the central processing unit.

The logic circuit outputs a logic 1 bit when logic 1 bits of the control data from the register are greater in number than logic 0 bits thereof and a logic 0 bit when logic 0 bits of the control data from the register are greater in number than logic 1 bits thereof.

The synchronization detector includes a register for storing a predetermined preamble therein; a shift register for receiving a preamble applied thereto upon the supply of control data from the encoder/decoder circuit and storing the received preamble therein in response to a reception clock signal from the encoder/decoder circuit; a first D flip-flop for receiving a synchronization detection signal at its clock terminal, a supply voltage at its data input terminal and a synchronization start signal from the central processing unit at its clear terminal and outputting the first synchronous signal to the data processing unit; a second D flip-flop for receiving the synchronization detection signal at its clock terminal and the supply voltage at its data input terminal and outputting the second synchronous signal to the data processing unit; a comparator for comparing the preamble from the shift register with that from the register and outputting the synchronization detection signal to the clock terminals of the first and second D flip-flops when they are the same; and an AND gate for ANDing a data start signal from the central processing unit and the synchronization start signal therefrom and outputting the ANDed result to a clear terminal of the second D flip-flop.

The intermediate frequency processing means includes an adder for adding data in the first frames from the channel control means; a quadrature amplitude modulation circuit for performing a quadrature amplitude modulation operation for a transmission frame from the adder to produce a digital intermediate frequency signal; a digital/analog converter for converting the digital intermediate frequency signal from the quadrature amplitude modulation circuit into an analog intermediate frequency signal and transferring the resultant analog intermediate frequency signal to the radio frequency transmission/reception means; and an intermediate frequency distributor for receiving the analog intermediate frequency signal from the radio frequency transmission/reception means and distributing the received analog intermediate frequency signal to a corresponding one of the channel control means.

The voice data and preamble are alternately and repeatedly transferred in the unit of frame and the voice data and control data are then alternately and repeatedly transferred in the unit of frame.

BRIEF DESCRIPTION OF THE DRAWINGS

The above and other objects, features and advantages of the present invention will be more clearly understood from the following detailed description taken in conjunction with the accompanying drawings, in which:

FIG. 1 is a block diagram of a conventional wireless PBX system;

FIG. 6A is a timing diagram illustrating the operation of the transmission control data processor in FIG. 5A;

FIG. 6B is a timing diagram illustrating the operations of the data separator and reception control data processor in FIGS. 5B and 5C; and FIG. 7 is a detailed block diagram of a synchronization detector in the channel controller in FIG. 2.

DETAILED DESCRIPTION OF THE PREFERRED EMBODIMENTS

Figure 2:
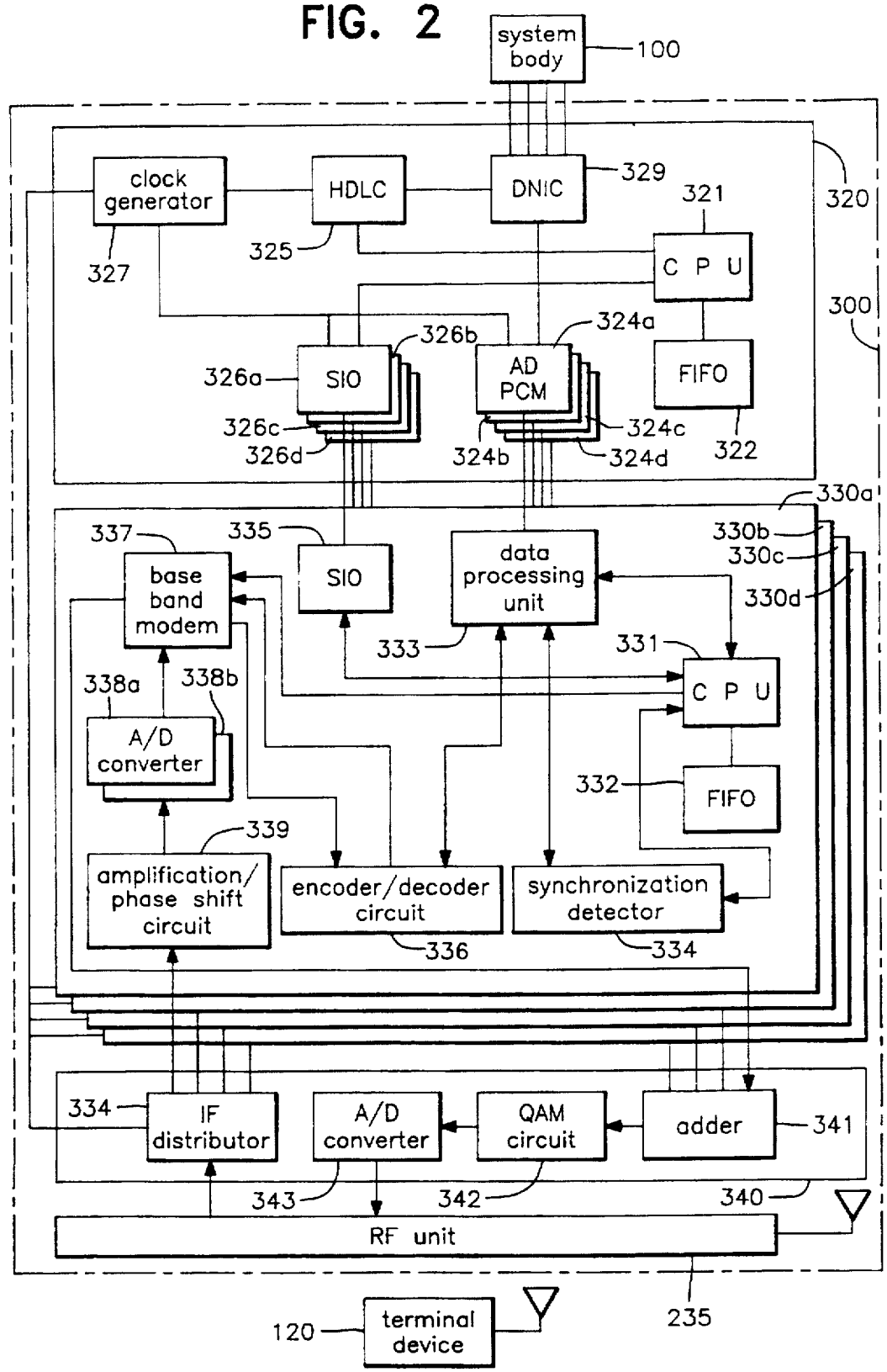
FIG. 2 is a block diagram of a digital wireless PBX system in accordance with the present invention.

Referring to FIG. 2, there is shown a block diagram of a digital wireless PBX system in accordance with the present invention. As shown in this drawing, the digital wireless PBX system comprises the system body 100, a base station 300 and the terminal device 120. The system body 100 transmits and receives voice data and control data with PCM data formats to/from the base station 300 through 2B+D channels (two B channels and one D channel). The voice data is transmitted and received through the 2B channels and the control data is transmitted and received through the D channel. The base station 300 receives the voice data and control data from the system body 100 and transmits the received voice data and control data simultaneously to the terminal device 120 through the radio channel. Also, the base station 200 receives voice data and control data from the terminal device 120 simultaneously through the radio channel and transmits the received voice data and control data to the system body 100. To this end, the base station 300 comprises a base station controller 320, a plurality of channel controllers 330a–330d, an intermediate frequency (referred to hereinafter as IF) processor 340 and the RF unit 235. The base station controller 320 includes a CPU 321, a first-in-first-out (referred to hereinafter as FIFO) memory 322, a DNIC 323, a plurality of adaptive differential pulse code modulation (referred to hereinafter as ADPCM) circuits 324a–324d, an HDLC unit 325, a plurality of SIO units 326a–326d and a clock generator 327. Each of the channel controllers 330a–330d includes a CPU 331, an FIFO memory 332, a data processing unit 333, a synchronization detector 334, an SIO unit 335, an encoder/decoder circuit 336, a base band modem 337, analog/digital (referred to hereinafter as A/D) converters 338a and 338b and an amplification/phase shift circuit 339. The IF processor 340 includes an adder 341, a quadrature amplitude modulation (referred to hereinafter as QAM) circuit 342, a digital/analog (referred to hereinafter as D/A) converter 343 and an IF distributor 344.

In the base station controller 320, the DNIC 323 transmits and receives the voice data and control data with PCM data formats to/from the system body 100 through the 2B+D channels. Namely, the DNIC 323 receives the voice data from the system body 100 through the 2B+D channels and transfers the received voice data to the ADPCM circuits 324a–324d. Also, the DNIC 323 receives the control data from the system body 100 through the 2B+D channels and transfers the received control data to the HDLC unit 325. The DNIC 323 further receives voice data from the ADPCM circuits 324a–324d and transmits the received voice data to the system body 100 through the 2B+D channels. The DNIC 323 further receives control data from the HDLC unit 325 and transmits the received control data to the system body 100 through the 2B+D channels. The HDLC unit 325 processes the control data from the DNIC 323 and outputs the processed control data to the CPU 321. The HDLC unit 325 also processes control data from the CPU 321 and outputs the processed control data to the DNIC 323. Each of the ADPCM circuits 324a–324d performs an adaptive differential pulse code modulation operation for the voice data from the DNIC 323 and transfers the resultant voice data to the data processing unit 333 in a corresponding one of the channel controllers 330a–330d. Also, each of the ADPCM circuits 324a–324d performs an adaptive differential pulse code demodulation operation for voice data from the data processing unit 333 in the corresponding one of the channel controllers 330a–330d and outputs the resultant voice data to the DNIC 323. The CPU 321 sequentially stores the control data from the HDLC unit 325 into the FIFO memory 322 and then outputs the stored data to the SIO units 326a–326d. Also, the CPU 321 sequentially stores control data from the SIO units 326a–326d into the FIFO memory 322 and then outputs the stored data to the HDLC unit 325. Each of the SIO units 326a–326d receives the control data from the CPU 321 and transfers the received control data to the SIO unit 335 in a corresponding one of the channel controllers 330a–330d. Also, each of the SIO units 326a–326d receives control data from the SIO unit 335 in the corresponding one of the channel controllers 330a–330d and transfers the received control data to the CPU 321. The clock generator 327 generates a clock signal and supplies the generated clock signal to the CPU 321, the ADPCM circuits 324a–324d, the SIO units 326a–326d, the channel controllers 330a–330d and the IF processor 340.

In each of the channel controllers 330a–330d, the SIO unit 335 receives the control data from a corresponding one of the SIO units 326a–326d in the base station controller 320 and transfers the received control data to the CPU 331. Also, the SIO unit 335 receives control data from the CPU 331 and transfers the received control data to the corresponding one of the SIO units 326a–326d. The CPU 331 sequentially stores the control data from the SIO unit 335 into the FIFO memory 332 and then outputs the stored control data to the data processing unit 333. Also, the CPU 331 sequentially stores control data from the data processing unit 333 into the FIFO memory 332 and then outputs the stored control data to the SIO unit 335. At this time, the CPU 331 performs the input and output of control data in response to an interrupt signal from the data processing unit 333. When the control data from the data processing unit 333 is abnormal, the CPU 331 resets a synchronous signal output of the synchronization detector 334 to control a synchronous signal detection operation thereof. The data processing unit 333 receives the voice data from a corresponding one of the ADPCM circuits 324a–324d in the base station controller 320 and the control data from the CPU 331 and forms the received data into one frame. The data processing unit 333 then supplies the formed frame to the encoder/decoder circuit 336. Also, the data processing unit 333 receives a frame from the encoder/decoder circuit 336 and separates the received frame into voice data and control data. The data processing unit 333 then transfers the separated voice data to the corresponding one of the ADPCM circuits 324a–324d. Also, the data processing unit 333 then transfers the separated control data to the CPU 331. The encoder/decoder circuit 336 encodes data in the frame from the data processing unit 333 for error correction and outputs the resultant frame to the base band modem 337. Also, the encoder/decoder circuit 336 decodes data in a frame from the base band modem 337 and outputs the resultant frame to the synchronization detector 334 and the data processing unit 333. The synchronization detector 334 detects a voice data synchronous signal and a control data synchronous signal from the frame from the encoder/decoder circuit 336 and outputs the detected synchronous signals to the data processing unit 333. Also, the synchronization detector 334 resets its synchronous signal output under the control of the CPU 331. Under the control of the CPU 331, the base band modem 337 spreads data in the frame from the encoder/decoder circuit 336 with a code division multiple access pseudo noise (referred to hereinafter as CDMA PN) code and transfers the resultant frame to the adder 341 in the IF processor 340. Also, the base band modem 337 performs a quadrature phase shift keying (referred to hereinafter as QPSK) demodulation operation for digital IF signals from the A/D converters 338a and 338b to extract a frame therefrom. The base band modem 337 then despreads the CDMA PN code from the extracted frame and outputs the resultant frame to the encoder/decoder circuit 336. The amplification/phase shift circuit 339 amplifies an analog IF signal from the IF distributor 344 in the IF processor 340 and shifts a phase of the amplified signal by 0° and 90°. Then, the amplification/phase shift circuit 339 supplies the resultant analog IF signals to the A/D converters 338a and 338b, respectively. The A/D converters 338a and 338b convert the analog IF signals from the amplification/phase shift circuit 339 into digital IF signals and supply the resultant digital IF signals to the base band modem 337, respectively.

In the IF processor 340, the adder 341 adds data in the frames from the base band modems 337 in the channel controllers 330a–330d and outputs the resultant frame to the QAM circuit 342. The QAM circuit 342 performs a quadrature amplitude modulation operation for data in the frame from the adder 341 and outputs the resultant digital IF signal to the D/A converter 343. The D/A converter 343 converts the digital IF signal from the QAM circuit 342 into an analog IF signal and transfers the resultant analog IF signal to the RF unit 235. The IF distributor 344 receives an analog IF signal from the RF unit 235 and distributes the received analog IF signal to the amplification/phase shift circuits 339 in the channel controllers 330a–330d.

The RF unit 235 modulates the analog IF signal from the D/A converter 343 in the IF processor 340 to convert it into an RF signal and transmits the resultant RF signal to the terminal device 120 through the radio channel. The RF unit 235 also receives an RF signal from the terminal device 120 through the radio channel and demodulates the received RF signal to convert it into an analog IF signal. Then, the RF unit 235 transfers the resultant analog IF signal to the IF distributor 344 in the IF processor 340.

Figure 4:
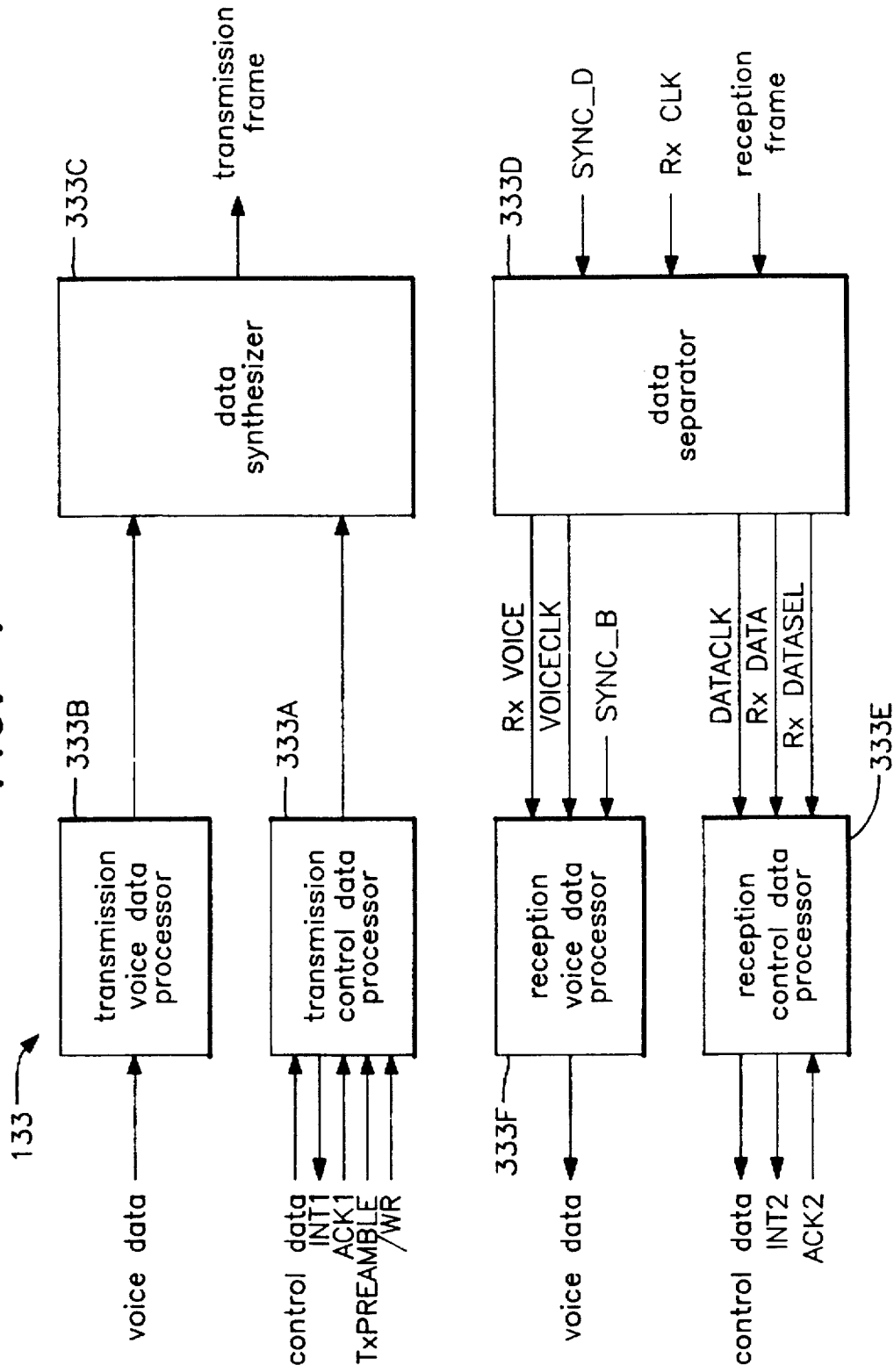
FIG. 4 is a detailed block diagram of a data processing unit in a channel controller in FIG. 2.

Referring to FIG. 4, there is shown a detailed block diagram of each of the data processing units 333 in the channel controllers 330a–330d in FIG. 2. As shown in this drawing, the data processing unit 333 includes a transmission control data processor 333A, a transmission voice data processor 333B, a data synthesizer 333C, a data separator 333D, a reception control data processor 333E and a reception voice data processor 333F. The transmission voice data processor 333B receives 4-bit voice data from a corresponding one of the ADPCM circuits 324a–324d in the base station controller 320. The transmission voice data processor 333B then extends lengths of bits of the received 4-bit voice data and outputs the resultant 4-bit voice data to the data synthesizer 333C. The transmission control data processor 333A outputs an interrupt signal INT1 to the CPU 331 and receives an interrupt acknowledge signal ACK1 and a write control signal /WR from the CPU 331. Then, the transmission control data processor 333A receives 8-bit control data from the CPU 331 and processes the received control data in response to a transmission preamble signal TxPREAMBLE to produce 4-bit control data which is applied to the data synthesizer 333C. The data synthesizer 333C forms the 4-bit voice data from the transmission voice data processor 333B and the 4-bit control data from the transmission control data processor 333A into one transmission frame and supplies the formed transmission frame to the encoder/decoder circuit 336. The data separator 333D receives a control data synchronous signal SYNC_D from the synchronization detector 334 and a reception clock signal RxCLK and a reception frame from the encoder/decoder circuit 336. The data separator 333D then separates the reception frame from the encoder/decoder circuit 336 into 4-bit control data RxDATA and 4-bit voice data RxVOICE. Also, the data separator 333D generates a reception data selection signal RxDATASEL, a control data clock signal DATACLK and a voice data clock signal VOICECLK. The reception voice data processor 333F processes the 4-bit voice data RxVOICE from the data separator 333D in response to the voice data clock signal VOICECLK from the data separator 333D and a voice data synchronous signal SYNC_B from the synchronization detector 334 to produce 8-bit voice data. Then, the reception voice data processor 333F transfers the produced 8-bit voice data to the corresponding one of the ADPCM circuits 324a–324d in the base station controller 320. The reception control data processor 333E receives the 4-bit control data RxDATA, control data clock signal DATACLK and reception data selection signal RxDATASEL from the data separator 333D and an interrupt acknowledge signal ACK2 from the CPU 331. The reception control data processor 333E then outputs an interrupt signal INT2 to the CPU 331. Also, the reception control data processor 333E converts the 4-bit control data RxDATA from the data separator 333D into 8-bit control data and supplies the resultant 8-bit control data to the CPU 331.

Figure 5A:
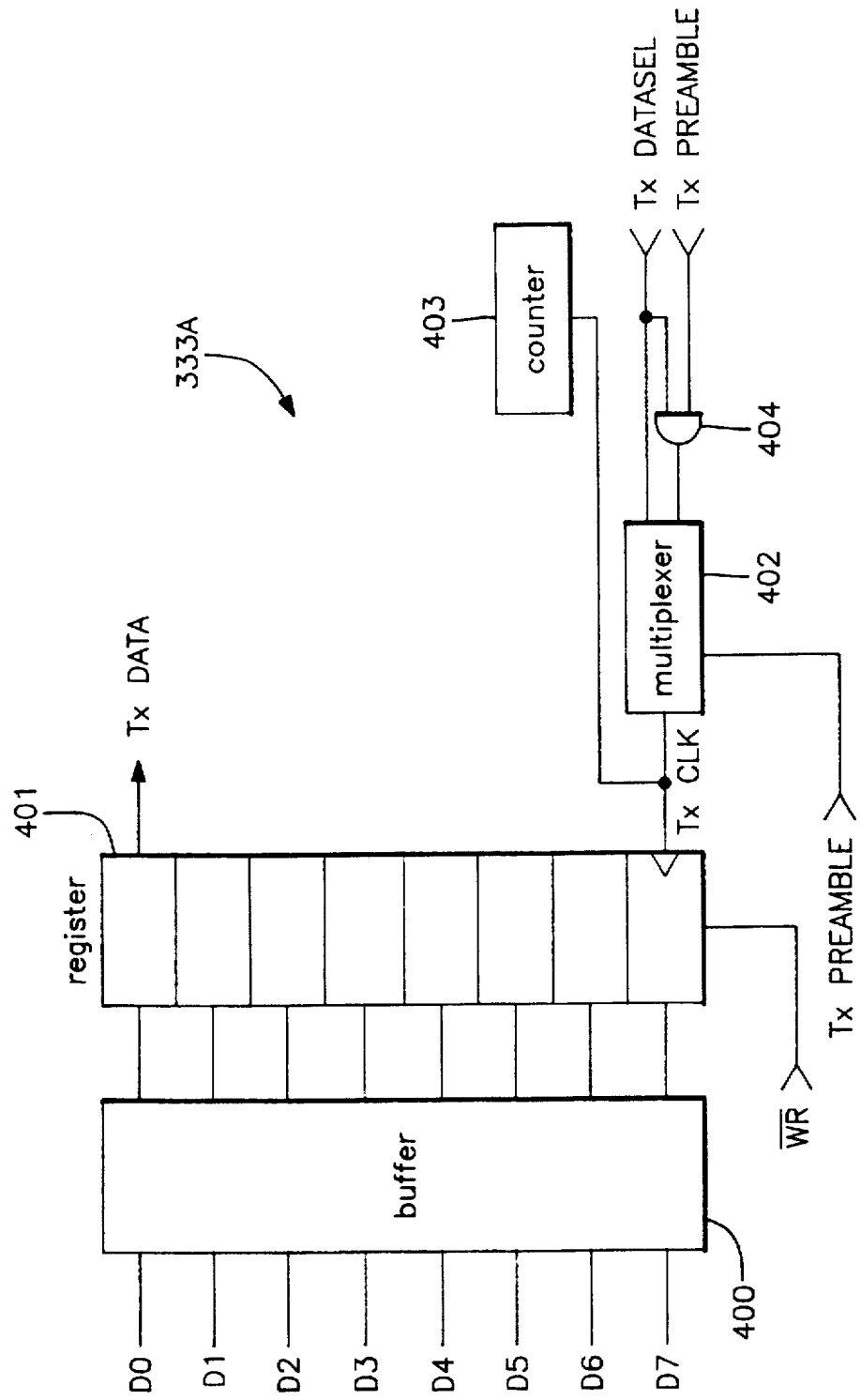
FIG. 5A is a detailed block diagram of a transmission control data processor in the data processing unit in FIG. 4.

Referring to FIG. 5A, there is shown a detailed block diagram of the transmission control data processor 333A in the data processing unit 333 in FIG. 4. As shown in this drawing, the transmission control data processor 333A includes a buffer 400, a register 401, a multiplexer 402, a counter 403 and an AND gate 404. The buffer 400 receives the 8-bit control data from the CPU 331 at its input terminals D0–D7 and stores the received 8-bit control data therein. The buffer 400 then outputs the stored 8-bit control data to the register 401. The register 401 stores the control data from the buffer 400 therein in response to the write control signal /WR from the CPU 331 and outputs the stored control data bit by bit in a serial manner to the encoder/decoder circuit 336 in response to a transmission clock signal TxCLK from the multiplexer 402. The AND gate 404 ANDs a transmission data selection signal TxDATASEL and a transmission preamble selection signal TxPREAMSEL and outputs the ANDed result to the multiplexer 402. The counter 403 performs a counting operation in response to the interrupt acknowledge signal ACK1 from the CPU 331 and the transmission clock signal TxCLK from the multiplexer 402. As a result of the counting operation, the counter 403 applies the interrupt signal INT1 to the CPU 331 at a desired period. The CPU 331 supplies the control data to the buffer 400 in response to the interrupt signal INT1 from the counter 403. The multiplexer 402 selects one of the transmission data selection signal TxDATASEL and an output signal from the AND gate 404 in response to the transmission preamble signal TxPREAMBLE and supplies the selected signal as the transmission clock signal TxCLK to the register 401 and the counter 403. The above-mentioned operation of the transmission control data processor 333A is performed on the basis of timing as shown in FIG. 6A.

Figure 5B:
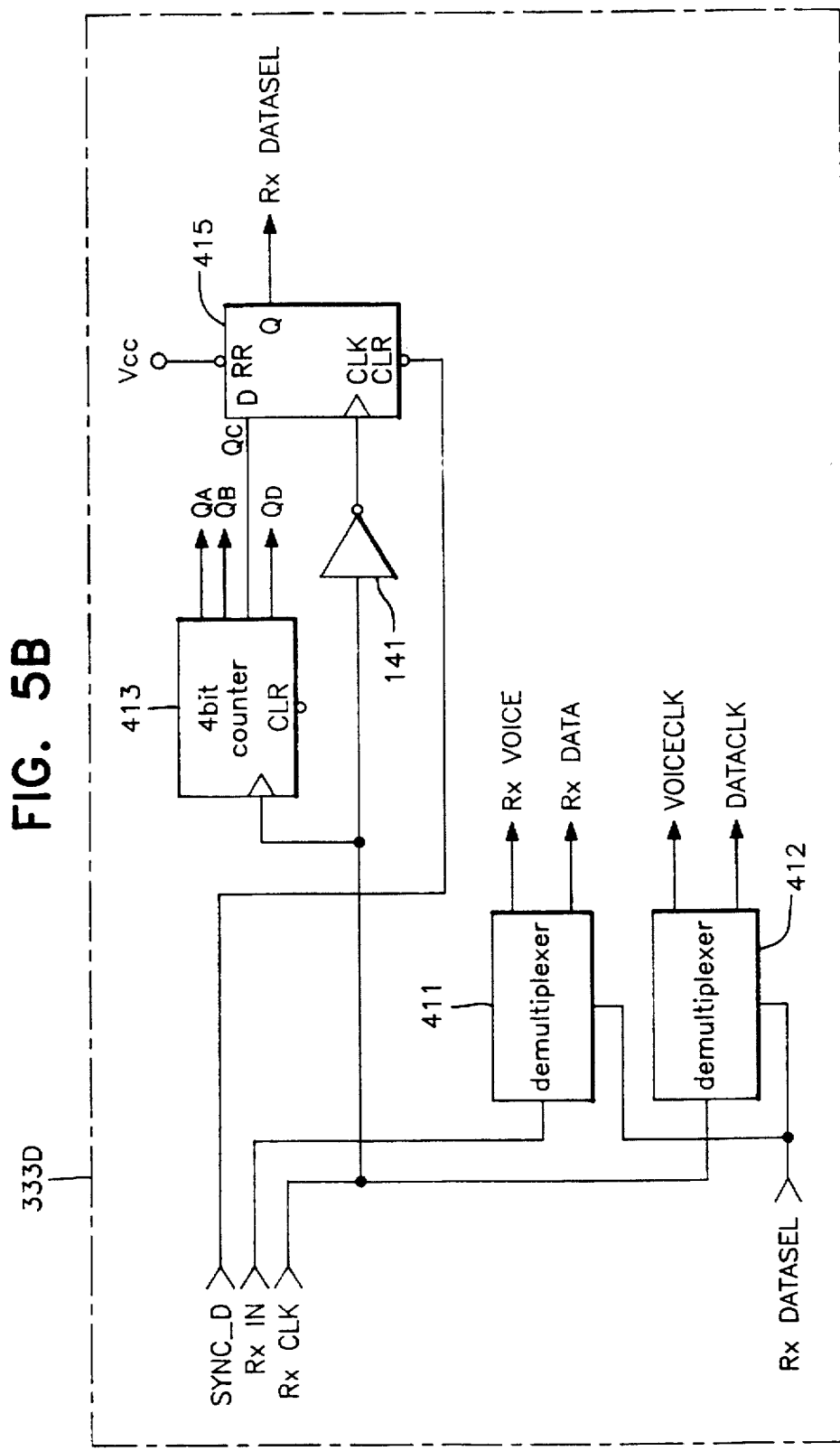
FIG. 5B is a detailed block diagram of a data separator in the data processing unit in FIG. 4.

Referring to FIG. 5B, there is shown a detailed block diagram of the data separator 333D in the data processing unit 333 in FIG. 4. As shown in this drawing, the data separator 333D includes a plurality of demultiplexers 411 and 412, a 4-bit counter 413, an inverter 414 and a D flip-flop 415. The 4-bit counter 413 performs a counting operation in response to the reception clock signal RxCLK from the encoder/decoder circuit 336. As a result of the counting operation, the 4-bit counter 413 generates a plurality of clocks $Q_A$–$Q_D$, wherein the clock $Q_C$ is applied to a data input terminal D of the D flip-flop 415. The inverter 414 inverts the reception clock signal RxCLK from the encoder/decoder circuit 336 and applies the resultant clock signal to a clock terminal CLK of the D flip-flop 415. The D flip-flop 415 receives the control data synchronous signal SYNC__D from the synchronization detector 334 at its clear terminal CLR, the clock $Q_C$ from the 4-bit counter 413 at its data input terminal D and the inverted reception clock signal from the inverter 414 at its clock terminal CLK. The D flip-flop 415 then generates the reception data selection signal RxDATASEL at its output terminal Q, which is applied to the demultiplexers 411 and 412 and the reception control data processor 333E. The demultiplexer 411 receives the reception frame from the encoder/decoder circuit 336 at its input terminal RxIN and separates the received frame into the control data RxDATA and the voice data RxVOICE in response to the reception data selection signal RxDATASEL from the D flip-flop 415. Then, the demultiplexer 411 supplies the separated voice data RxVOICE to the reception voice data processor 333F and the separated control data RxDATA to the reception control data processor 333E, respectively. The demultiplexer 412 receives the reception clock signal RxCLK from the encoder/decoder circuit 336 and separates the received clock signal into the voice data clock signal VOICECLK and the control data clock signal DATACLK in response to the reception data selection signal RxDATASEL from the D flip-flop 415. Then, the demultiplexer 412 supplies the separated voice data clock signal VOICECLK to the reception voice data processor 333F and the separated control data clock signal DATACLK to the reception control data processor 333E, respectively. The above-mentioned operation of the data separator 333D is performed on the basis of timing as shown in FIG. 6B.

Figure 5C:
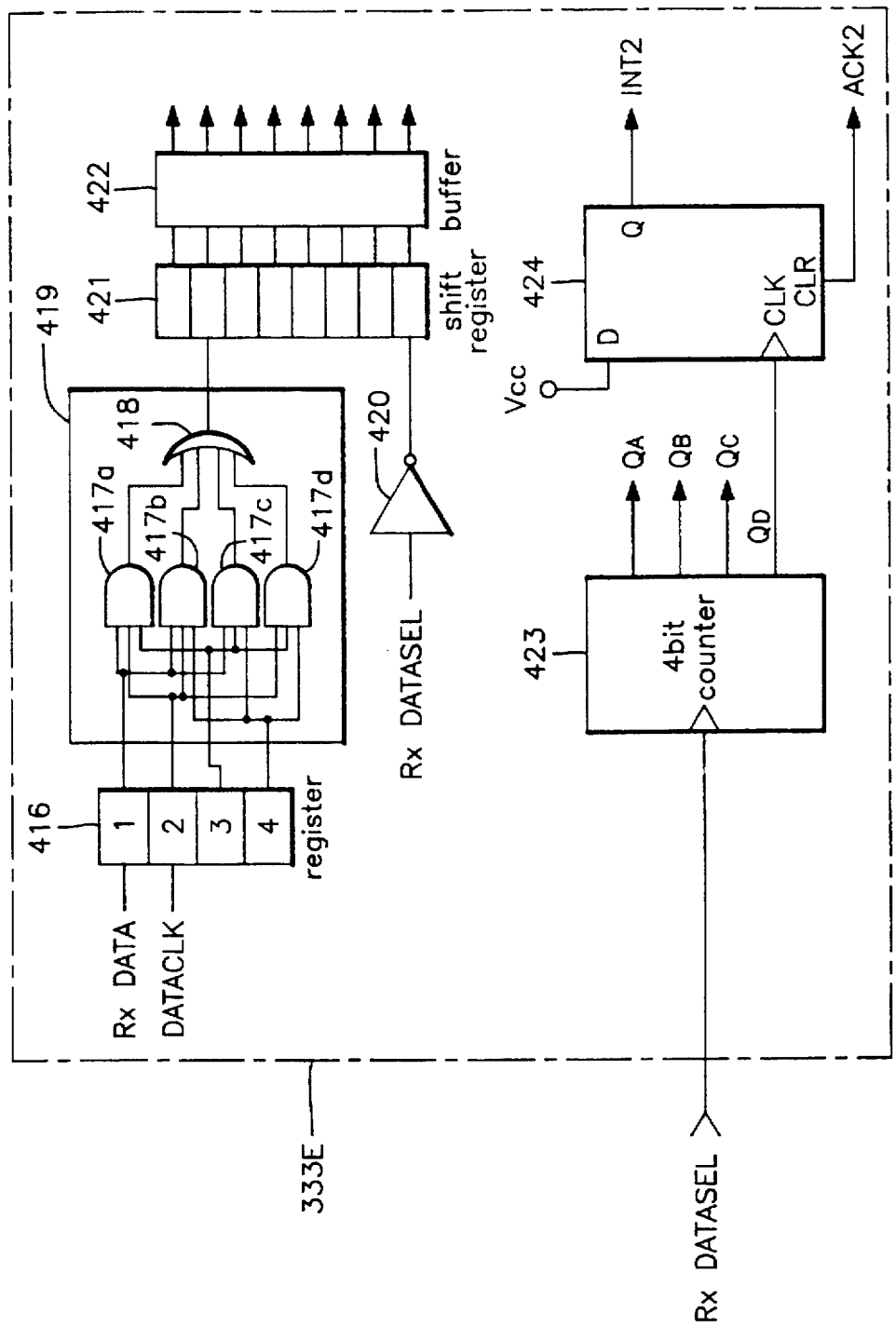
FIG. 5C is a detailed block diagram of a reception control data processor in the data processing unit in FIG. 4.

Referring to FIG. 5C, there is shown a detailed block diagram of the reception control data processor 333E in the data processing unit 333 in FIG. 4. As shown in this drawing, the reception control data processor 333E includes a register 416, a logic circuit 419, an inverter 420, a shift register 421, a buffer 422, a 4-bit counter 423 and a D-flip-flop 424. The register 416 transfers the 4-bit control data RxDATA from the demultiplexer 411 in the data separator 333D to the logic circuit 419 in response to the control data clock signal DATACLK from the demultiplexer 412. The logic circuit 419 performs a logical operation for the 4-bit control data from the register 416 to output a bit of logic 0 or logic 1. Namely, when logic 1 bits of the 4-bit control data from the register 416 are greater in number than logic 0 bits thereof, the logic circuit 419 outputs a logic 1 bit. On the contrary, in the case where logic 0 bits of the 4-bit control data from the register 416 are greater in number than logic 1 bits thereof, the logic circuit 419 outputs a logic 0 bit. In this manner, the logic circuit 419 converts the parallel control data from the register 416 into serial control data and supplies the resultant serial control data to the shift register 421. To this end, the logic circuit 419 includes a plurality of AND gates 417a–417d and an OR gate 418. The inverter 420 inverts the reception data selection signal RxDATASEL from the D flip-flop 415 in the data separator 333D and applies the resultant signal to a clock terminal of the shift register 421. The shift register 421 transfers the serial control data from the logic circuit 419 to the buffer 422 in a parallel manner in response to the inverted reception data selection signal from the inverter 420. The buffer 422 supplies the control data from the shift register 421 to the CPU 331. The 4-bit counter 423 performs a counting operation in response to the reception data selection signal RxDATASEL from the D flip-flop 415 in the data separator 333D. As a result of the counting operation, the 4-bit counter 423 generates a plurality of clocks $Q_A$–$Q_D$, wherein the clock $Q_D$ is applied to a clock terminal CLK of the D flip-flop 424. The D flip-flop 424 receives a supply voltage Vcc at its data input terminal D, the clock $Q_D$ from the 4-bit counter 423 at its clock terminal CLK and the interrupt acknowledge signal ACK2 from the CPU 331 at its clear terminal CLR. The D flip-flop 424 then generates the interrupt signal INT2 at its output terminal Q, which is applied to the CPU 331. Upon receiving the interrupt signal INT2 from the D flip-flop 424, the CPU 331 reads the control data from the buffer 422. The above-mentioned operation of the reception control data processor 333E is performed on the basis of timing as shown in FIG. 6B.

Referring to FIG. 7, there is shown a detailed block diagram of each of the synchronization detectors 334 in the channel controllers 330a–330d in FIG. 2. As shown in this drawing, the synchronization detector 334 includes a shift register 500, a comparator 501, a register 502, a plurality of D flip-flops 503 and 504 and an AND gate 505. The register 502 stores a predetermined 5-byte preamble therein and outputs the stored 5-byte preamble to the comparator 501. The shift register 500 receives a 10-byte preamble applied thereto upon the supply of control data from the encoder/decoder circuit 336. The shift register 500 then stores the received 10-byte preamble therein in response to the reception clock signal RxCLK from the encoder/decoder circuit 336 and outputs the stored 10-byte preamble 5 bytes by 5 bytes to the comparator 501. The comparator 501 compares the 5-byte preambles from the shift register 500 and register 502 with each other. When the 5-byte preambles from the shift register 500 and register 502 are the same, the comparator 501 outputs a synchronization detection signal to clock terminals CLK of the D flip-flops 503 and 504. The D flip-flop 503 receives the synchronization detection signal from the comparator 501 at its clock terminal CLK, the supply voltage Vcc at its data input terminal D and a synchronization start signal /SYNCINIT from the CPU 331 at its clear terminal CLR. The D flip-flop 503 then generates the voice data synchronous signal SYNC_B at its output terminal Q and supplies it to the reception voice data processor 333F in the data processing unit 333. The AND gate 505 ANDs a data start signal /DATAINIT from the CPU 331 and the synchronization start signal /SYNCINIT therefrom and outputs the ANDed result to a clear terminal CLR of the D flip-flop 504. The D flip-flop 504 receives the synchronization detection signal from the comparator 501 at its clock terminal CLK, the supply voltage Vcc at its data input terminal D and an output signal from the AND gate 505 at its clear terminal CLR. The D flip-flop 503 then generates the control data synchronous signal SYNC_D at its output terminal Q and supplies it to the data separator 333D in the data processing unit 333.

The operation of the digital wireless PBX system with the above-mentioned construction in accordance with the present invention will hereinafter be described in more detail.

Figure 3A:
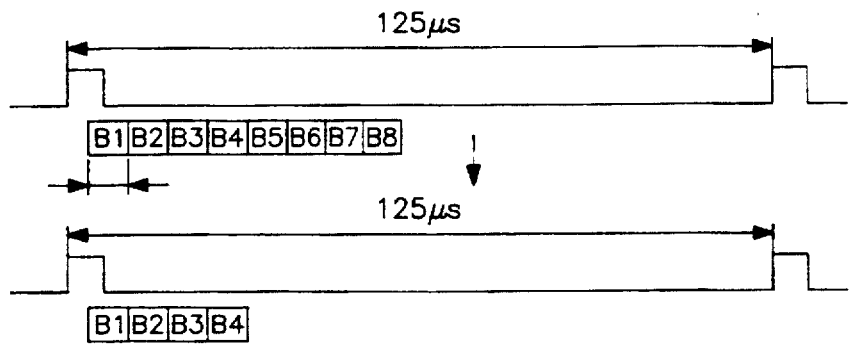
FIGS. 3A to 3G are timing diagrams illustrating transmission and reception operations of the digital wireless PBX system in accordance with the present invention.
Figure 3B:
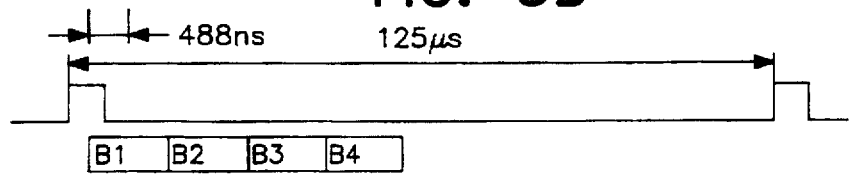
Figure 3C:
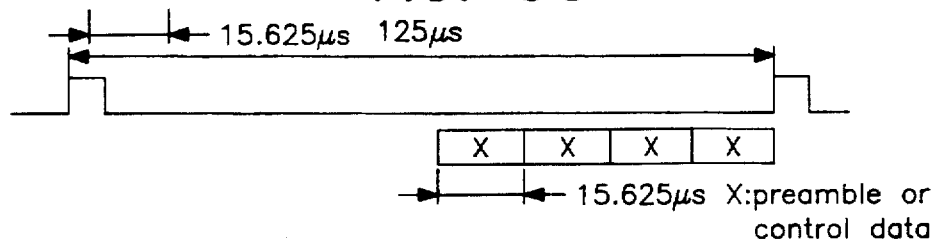
Figure 3D:
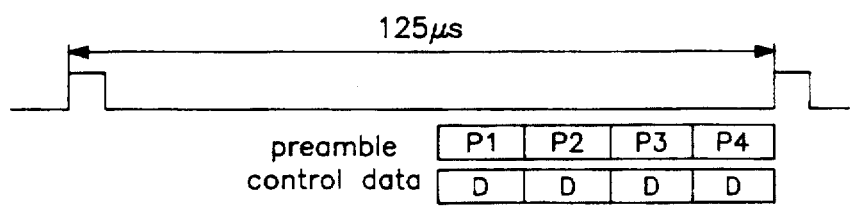
Figure 3E:
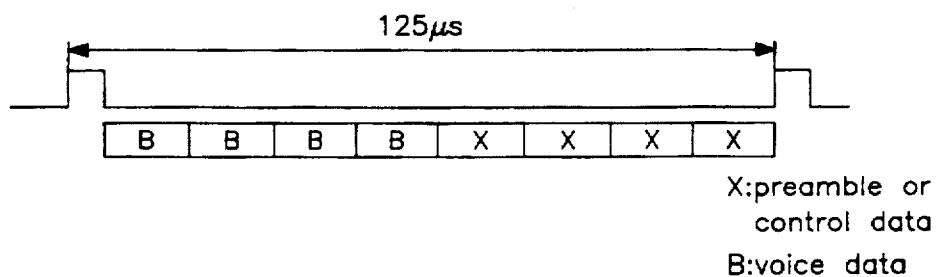
Figure 3F:
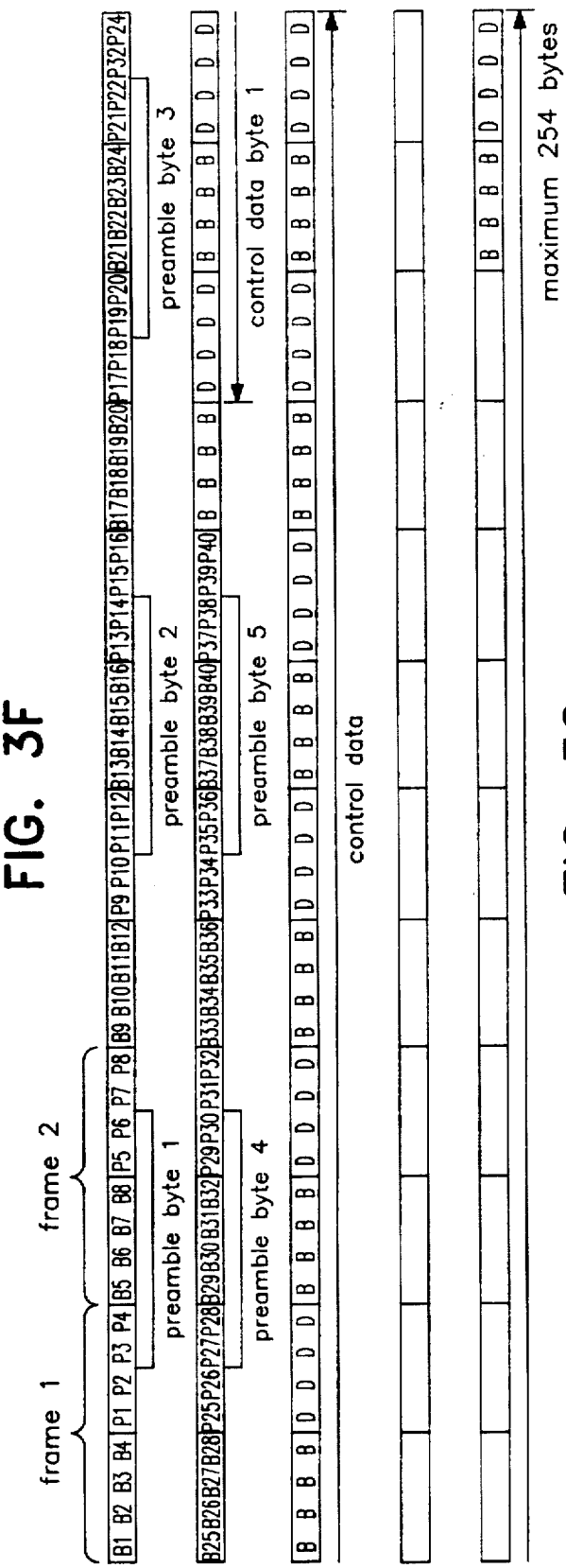

First, in the case where the system body 100 transmits voice data and control data with PCM data formats to the base station controller 320 through the 2B+D channels, the DNIC 323 in the base station controller 320 transfers the voice data (transfer rate of 64 Kbps) of 2B channels to the ADPCM circuits 324a–324d and the control data of D channel to the HDLC unit 325, separately. Then in the base station controller 320, each of the ADPCM circuits 324a–324d performs the adaptive differential pulse code modulation operation for 8-bit voice data from the DNIC 323 to convert it into 4-bit voice data as shown in FIG. 3A. Each of the ADPCM circuits 324a–324d then transfers the 4-bit voice data to the data processing unit 333 in a corresponding one of the channel controllers 330a–330d. Upon receiving the 4-bit voice data from the corresponding one of the ADPCM circuits 324a–324d, the transmission voice data processor 333B in the data processing unit 333 extends lengths of bits of the received 4-bit voice data as shown in FIG. 3B. Namely, a bit length is extended from 488 ns to 15.625 μs. The transmission voice data processor 333B then supplies the resultant 4-bit voice data to the encoder/decoder circuit 336. On the other hand, the HDLC unit 325 processes the control data of D channel from the DNIC 323 and outputs the processed control data to the CPU 321. The CPU 321 sequentially stores the control data from the HDLC unit 325 into the FIFO memory 322 and then outputs the stored data byte by byte to the SIO units 326a–326d. Each of the SIO units 326a–326d transfers the control data from the CPU 321 to the SIO unit 335 in a corresponding one of the channel controllers 330a–330d. Then in each of the channel controllers 330a–330d, the SIO unit 335 transfers the control data from the corresponding one of the SIO units 326a–326d in the base station controller 320 to the CPU 331. The CPU 331 sequentially stores the control data from the SIO unit 335 into the FIFO memory 332 and then outputs the stored data to the data processing unit 333. Then in the data processing unit 333, the transmission control data processor 333A receives the control data from the CPU 331. In the transmission control data processor 333A, the buffer 400 stores the control data from the CPU 331 and then outputs the stored control data to the register 401. The register 401 transfers the control data from the buffer 400 to the data synthesizer 333C in a serial manner. When the transfer of control data from the register 401 has been completed, the counter 403 outputs the interrupt signal INT1 to the CPU 331, thereby allowing the CPU 331 to apply new control data to the buffer 400. Noticeably, the register 401 transfers the control data from the buffer 400 bit by bit to the data synthesizer 333C in response to the transmission clock signal TxCLK from the multiplexer 402. In result, the register 401 transfers 4-bit data, each bit of which has a length of 15.625 μs as shown in FIG. 3C. At this time, the register 401 outputs a preamble to the data synthesizer 333C separately from the control data as shown in FIG. 3D. Namely, in the case of receiving an 8-bit preamble from the CPU 331, the transmission control data processor 333A extends lengths of 4 bits of the received 8-bit preamble and outputs the resultant 4-bit preamble as shown in FIG. 3D to the data synthesizer 333C. Then, the transmission control data processor 333A outputs the remaining 4 bits to the data synthesizer 333C in the subsequent frame in the same manner. In the case of receiving 8-bit control data from the CPU 331, the transmission control data processor 333A extends bit lengths of the received 8-bit control data and outputs the resultant control data as shown in FIG. 3D to the data synthesizer 333C. The transmission control data processor 333A outputs the preamble at a transfer rate of 32 Kbps and the control data at a transfer rate of 8 Kbps, respectively. The data synthesizer 333C forms the voice data from the transmission voice data processor 333B and the control data and preamble from the transmission control data processor 333A into one transmission frame as shown in FIG. 3E and supplies the formed transmission frame to the encoder/decoder circuit 336. Namely, the data synthesizer 333C repeatedly outputs an 8-bit data frame with a length of 125 μs as shown in FIG. 3E to the encoder/decoder circuit 336 in response to a synchronous signal. As a result, the data synthesizer 333C outputs frames as shown in FIG. 3F to the encoder/decoder circuit 336. In this manner, the voice data B and the preamble P are alternately and repeatedly transferred in the unit of frame and the voice data B and the control data D are then alternately and repeatedly transferred in the unit of frame. In the entire frame length, the preamble P has a length of 5 bytes and the control data D has a variable length up to the maximum 254 bytes.

The encoder/decoder circuit 336 encodes data in the frame from the data synthesizer 333C in the data processing unit 333 and outputs the resultant frame to the base band modem 337. Under the control of the CPU 331, the base band modem 337 spreads data in the frame from the encoder/decoder circuit 336 with the CDMA PN code and transfers the resultant frame to the adder 341 in the IF processor 340. In the IF processor 340, the adder 341 adds data in the frames from the base band modems 337 in the channel controllers 330a–330d and outputs the resultant frame to the QAM circuit 342. The QAM circuit 342 performs the quadrature amplitude modulation operation for data in the frame from the adder 341 to convert it into a digital IF signal. The QAM circuit 342 then outputs the resultant digital IF signal to the D/A converter 343. The D/A converter 343 converts the digital IF signal from the QAM circuit 342 into an analog IF signal and transfers the resultant analog IF signal to the RF unit 235. The RF unit 235 modulates the analog IF signal from the D/A converter 343 in the IF processor 340 to convert it into an RF signal. The RF unit 235 then transmits the resultant RF signal to the terminal device 120 through the radio channel.

On the other hand, upon receiving an RF signal from the terminal device 120 through the radio channel, the RF unit 235 demodulates the received RF signal to convert it into an analog IF signal. The RF unit 235 then transfers the resultant analog IF signal to the IF distributor 344 in the IF processor 340. The IF distributor 344 receives the analog IF signal from the RF unit 235 and distributes the received analog IF signal to the amplification/phase shift circuits 339 in the channel controllers 330a–330d. Then in each of the channel controllers 330a–330d, the amplification/phase shift circuit 339 amplifies the analog IF signal from the IF distributor 344 in the IF processor 340 and shifts a phase of the amplified signal by 0° and 90°. The amplification/phase shift circuit 339 then supplies the resultant two analog IF signals to the A/D converters 338a and 338b, respectively. The A/D converters 338a and 338b convert the analog IF signals from the amplification/phase shift circuit 339 into digital IF signals and supply the resultant digital IF signals to the base band modem 337, respectively. The base band modem 337 performs the QPSK demodulation operation for the digital IF signals from the A/D converters 338a and 338b to extract a frame therefrom. The base band modem 337 then despreads the CDMA PN code from the extracted frame and outputs the resultant frame to the encoder/decoder circuit 336. The encoder/decoder circuit 336 decodes data in the reception frame from the base band modem 337 and outputs the resultant frame as shown in FIG. 3F to the data processing unit 333 and the synchronization detector 334. In the synchronization detector 334, the shift register 500 receives a 10-byte preamble from the encoder/decoder circuit 336 and outputs the stored 10-byte preamble 5 bytes by 5 bytes to the comparator 501 which also receives a 5-byte preamble from the register 502. The comparator 501 compares the 5-byte preambles from the shift register 500 and register 502 with each other. When the 5-byte preambles from the shift register 500 and register 502 are the same, the comparator 501 outputs the synchronization detection signal to the D flip-flops 503 and 504. In response to the synchronization detection signal from the comparator 501, the D flip-flop 503 outputs the voice data synchronous signal SYNC_B to the reception voice data processor 333F in the data processing unit 333 and the D flip-flop 504 outputs the control data synchronous signal SYNC_D to the data separator 333D in the data processing unit 333. The CPU 331 checks the presence of an error in the control data of each frame as shown in FIG. 3F after or while receiving it. In the case where an error is present in the control data, the CPU 331 outputs the synchronization start signal /SYNCINIT to the D flip-flop 503. Also, the CPU 331 applies the data start signal /DATAINIT and the synchronization start signal /SYNCINIT to the AND gate 505. As a result, the D flip-flops 503 and 504 are reset to output the voice data synchronous signal SYNC_B and the control data synchronous signal SYNC_D detected from a preamble in the subsequent frame.

Figure 3G:
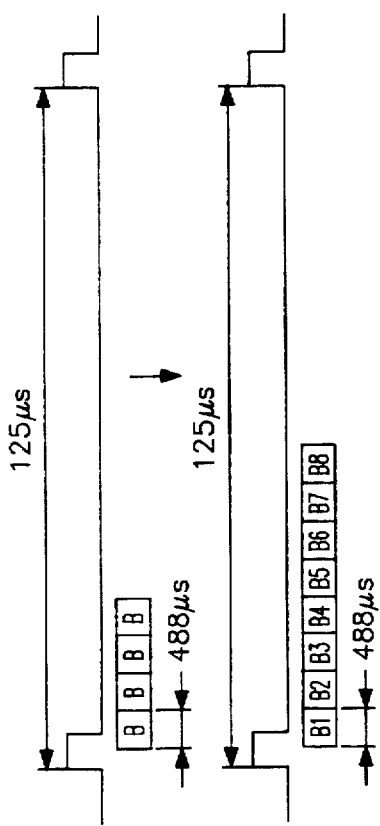

Upon receiving the voice data synchronous signal SYNC_B and the control data synchronous signal SYNC_D from the synchronization detector 334 and the reception frame from the encoder/decoder circuit 336, the data processing unit 333 processes data in the received frame. In the data processing unit 333, the data separator 333D separates each reception frame from the encoder/decoder circuit 336 into control data and voice data. The data separator 333D then outputs the separated voice data to the reception voice data processor 333F and the separated control data to the reception control data processor 333E, respectively. The reception voice data processor 333F processes the voice data from the data separator 333D to restore it as shown in FIG. 3G. The reception voice data processor 333F then transfers the restored voice data to the corresponding one of the ADPCM circuits 324a–324d in the base station controller 320. The reception control data processor 333E converts the control data from the data separator 333D into 8-bit control data and supplies the resultant 8-bit control data to the CPU 331. In more detail, in the data separator 333D, the demultiplexer 411 separates the reception frame from the encoder/decoder circuit 336 into voice data RxVOICE and control data RxDATA. The demultiplexer 411 then outputs the separated voice data RxVOICE to the reception voice data processor 333F and the separated control data RxDATA to the reception control data processor 333E, respectively. In the reception control data processor 333E, the register 416 transfers the control data RxDATA from the demultiplexer 411 in the data separator 333D to the logic circuit 419. The logic circuit 419 performs a logical operation for the control data from the register 416 to output a bit of logic 0 or logic 1. Namely, when logic 1 bits of the control data from the register 416 are greater in number than logic 0 bits thereof, the logic circuit 419 outputs a logic 1 bit. On the contrary, in the case where logic 0 bits of the control data from the register 416 are greater in number than logic 1 bits thereof, the logic circuit 419 outputs a logic 0 bit. In this manner, the logic circuit 419 converts the parallel control data from the register 416 into serial control data and supplies the resultant serial control data to the shift register 421. In result, the 8-bit control data is applied to the CPU 331 by the shift register 421 and buffer 422. The CPU 331 receives the control data from the buffer 422 in response to the interrupt signal INT2 from the D flip-flop 424.

The CPU 331 sequentially the control data from the data processing unit 333 into the FIFO memory 332 and then outputs the stored control data to a corresponding one of the SIO units 326a–326d in the base station controller 320 through the SIO unit 335. The CPU 321 sequentially stores the control data from the SIO units 326a–326d into the FIFO memory 322 and then outputs the stored control data to the HDLC unit 325. The HDLC unit 325 processes the control data from the CPU 321 and outputs the processed control data to the DNIC 323. On the other hand, each of the ADPCM circuits 324a–324d performs the adaptive differential pulse code demodulation operation for the voice data from the data processing unit 333 in the corresponding one of the channel controllers 330a–330d and outputs the resultant voice data to the DNIC 323. In result, the DNIC 323 transmits the voice data from the ADPCM circuits 324a–324d and the control data from the HDLC unit 325 to the system body 100 through the 2B+D channels.

As apparent from the above description, according to the present invention, the voice data and the control data are formed into one frame so that they can simultaneously be transmitted and received between the base station and the terminal device. Therefore, in the case where control data such as handover is generated to change a telephone conversation region in the middle of telephone conversation, it can be transmitted and received simultaneously with the voice data, so as to prevent the telephone conversation from being suspended. Also, the RF unit needs not check which of the voice data and the control data has been transmitted and received. As a result, the transmission and reception operations through the radio channel can rapidly be performed. Further, the transmitted and received control data has 4 bits with the same contents. Therefore, the control data can correctly be recovered although any one bit thereof is subjected to damage due to an error on the radio channel, thereby increasing the reliability of the data transmission and reception. Moreover, the voice data synchronization and the control data synchronization are separately monitored, thereby making the synchronization maintenance and recovery easy. This has the effect of increasing the communication efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A digital wireless private branch exchange system comprising a system body for transmitting and receiving voice data and control data with pulse code modulation data formats, a terminal device for transmitting and receiving a radio frequency signal through a radio channel and a base station for converting the voice data and control data from said system body into a radio frequency signal, transmitting the radio frequency signal to said terminal device through said radio channel, receiving the radio frequency signal from said terminal device through said radio channel, extracting the voice data and control data from the received radio frequency signal and transmitting the extracted voice data and control data to said system body, wherein said base station comprises:

radio frequency transmission/reception means for modulating an analog intermediate frequency signal to convert it into the radio frequency signal, transmitting the radio frequency signal to said terminal device through said radio channel, receiving the radio frequency signal from said terminal device through said radio channel, demodulating the received radio frequency signal to convert it into an analog intermediate frequency signal and transferring the analog intermediate frequency signal;

intermediate frequency processing means for converting a plurality of first frames with the voice data and control data into an analog intermediate frequency signal, transferring the analog intermediate frequency signal to said radio frequency transmission/reception means and distributing the analog intermediate frequency signal from said radio frequency transmission/reception means;

base station control means for transmitting and receiving the voice data and control data to/from said system body; and a plurality of channel control means, each of said channel control means forming the voice data and control data from said base station control means into the first frame, transferring the formed first frame to said intermediate frequency processing means, extracting a second frame from the analog intermediate frequency signal distributed from said intermediate frequency processing means, separating the extracted second frame into the voice data and control data and transferring the separated voice data and control data to said base station control means.

2. A digital wireless private branch exchange system as set forth in claim 1, wherein said base station control means includes:

a digital network interface circuit for receiving the voice data and control data from said system body, separately outputting the received voice data and the received control data and simultaneously transmitting the voice data and control data from said base station control means to said system body;

a central processing unit for sequentially storing the control data from said digital network interface circuit into a first-in-first-out memory and then outputting the stored control data;

a high level data link control unit for processing the control data from said digital network interface circuit, outputting the processed control data to said central processing unit, processing the control data from said central processing unit and outputting the processed control data to said digital network interface circuit;

a plurality of adaptive differential pulse code modulation circuits, each of said adaptive differential pulse code modulation circuits performing an adaptive differential pulse code modulation operation for the voice data from said digital network interface circuit, transferring the voice data to a corresponding one of said channel control means, performing an adaptive differential pulse code demodulation operation for the voice data from said corresponding channel control means and outputting the voice data to said digital network interface circuit;

a plurality of serial input/output units, each of said serial input/output units transferring the control data from said central processing unit to said each channel control means and transferring the control data from said each channel control means to said central processing unit; and a clock generator for generating a clock signal and supplying the generated clock signal to said central processing unit, said adaptive differential pulse code modulation circuits, said serial input/output units, said channel control means and said intermediate frequency processing means.

3. A digital wireless private branch exchange system as set forth in claim 1, wherein said each channel control means includes:

a central processing unit for sequentially storing the control data from said base station control means into a first-in-first-out memory, outputting the stored control data and controlling a synchronous signal detection operation;

a serial input/output unit for transferring the control data from said base station control means to said central processing unit and transferring the control data from said central processing unit to said base station control means;

a data processing unit for forming the voice data from said base station control means and the control data from said central processing unit into the first frame, separating the second frame into voice data and control data and transferring the separated voice data to said base station control means and the separated control data to said central processing unit, respectively;

a synchronization detector for detecting first and second synchronous signals from the second frame, outputting the detected first and second synchronous signals to said data processing unit and resetting the synchronous signal detection operation under the control of said central processing unit;

an encoder/decoder circuit for encoding data in the first frame from said data processing unit for error correction, outputting the first frame, decoding data in the second frame and outputting the second frame to said synchronization detector and said data processing unit;

a base band modem for spreading data in the first frame from said encoder/decoder circuit with a code division multiple access pseudo noise code, transferring the first frame to said intermediate frequency processing means, performing a quadrature phase shift keying demodulation operation for digital intermediate frequency signals to extracting the second frame therefrom, despreading the code division multiple access pseudo noise code from the extracted second frame and outputting the second frame to said encoder/decoder circuit;

an amplification/phase shift circuit for amplifying the analog intermediate frequency signal from said intermediate frequency processing means and shifting a phase of the amplified signal by first and second angles; and a plurality of analog/digital converters for converting the phase-shifted analog intermediate frequency signals from said amplification/phase shift circuit into digital intermediate frequency signals and supplying the digital intermediate frequency signals to said base band modem, respectively.

4. A digital wireless private branch exchange system as set forth in claim 3, wherein said data processing unit includes:

a transmission voice data processor for receiving the voice data from said base station control means and extending lengths of bits of the received voice data;

a transmission control data processor for outputting a first interrupt signal to said central processing unit and processing the control data from said central processing unit in response to a transmission preamble signal and a first interrupt acknowledge signal from said central processing unit to change a number of bits thereof;

a data synthesizer for forming voice data from said transmission voice data processor and control data from said transmission control data processor into the first frame and supplying the first frame to said encoder/decoder circuit;

a data separator for receiving the second synchronous signal from said synchronization detector and a reception clock signal and the second frame from said encoder/decoder circuit, separating the received second frame into control data and voice data and generating a reception data selection signal, a control data clock signal and a voice data clock signal;

a reception voice data processor for processing the voice data from said data separator in response to the voice data clock signal from said data separator and the first synchronous signal from said synchronization detector to change the number of bits thereof and transferring the voice data to said base station control means; and a reception control data processor for receiving the control data, control data clock signal and reception data selection signal from said data separator and a second interrupt acknowledge signal from said central processing unit, outputting a second interrupt signal to said central processing unit, changing the number of bits of the received control data and supplying the control data to said central processing unit.

5. A digital wireless private branch exchange system as set forth in claim 3, wherein said transmission control data processor includes:

a buffer for storing the control data from said central processing unit therein;

a register for storing the control data from said buffer in a parallel manner therein in response to a write control signal from said central processing unit and outputting the stored control data in a serial manner to said encoder/decoder circuit in response to a transmission clock signal;

an AND gate for ANDing a transmission data selection signal and a transmission preamble selection signal;

a counter for performing a counting operation in response to the first interrupt acknowledge signal from said central processing unit and the transmission clock signal to output the first interrupt signal to said central processing unit at a desired period; and a multiplexer for selecting one of the transmission data selection signal and an output signal from said AND gate in response to the transmission preamble signal and supplying the selected signal as the transmission clock signal to said register and said counter.

6. A digital wireless private branch exchange system as set forth in claim 3, wherein said data separator includes:

a counter for performing a counting operation in response to the reception clock signal from said encoder/decoder circuit to generate a plurality of clocks;

an inverter for inverting the reception clock signal from said encoder/decoder circuit;

a D flip-flop for generating the reception data selection signal in response to the second synchronous signal from said synchronization detector, a desired one of the clocks from said counter and the inverted reception clock signal from said inverter;

a first demultiplexer for separating the second frame from said encoder/decoder circuit into control data and voice data in response to the reception data selection signal from said D flip-flop; and a second demultiplexer for separating the reception clock signal from said encoder/decoder circuit into the voice data clock signal and the control data clock signal in response to the reception data selection signal from said D flip-flop.

7. A digital wireless private branch exchange system as set forth in claim 3, wherein said reception control data processor includes:

a register for transferring the control data from said data separator in response to the control data clock signal from said data separator;

a logic circuit including a plurality of AND gates and an OR gate, said logic circuit performing a logical operation for the control data from said register;

an inverter for inverting the reception data selection signal from said data separator;

a shift register for receiving control data from said logic circuit in a serial manner and outputting the received control data in a parallel manner in response to the inverted reception data selection signal from said inverter;

a buffer for supplying the control data from said shift register to said central processing unit;

a counter for performing a counting operation in response to the reception data selection signal from said data separator to generate a plurality of clocks; and a D flip-flop for generating the second interrupt signal in response to a desired one of the clocks from said counter and the second interrupt acknowledge signal from said central processing unit and outputting the generated second interrupt signal to said central processing unit.

8. A digital wireless private branch exchange system as set forth in claim 7, wherein said logic circuit outputs a logic 1 bit when logic 1 bits of the control data from said register are greater in number than logic 0 bits thereof and a logic 0 bit when logic 0 bits of the control data from said register are greater in number than logic 1 bits thereof.

9. A digital wireless private branch exchange system as set forth in claim 3, wherein said synchronization detector includes:

a register for storing a predetermined preamble therein;

a shift register for receiving a preamble applied thereto upon the supply of control data from said encoder/decoder circuit and storing the received preamble therein in response to a reception clock signal from said encoder/decoder circuit;

a first D flip-flop for receiving a synchronization detection signal at its clock terminal, a supply voltage at its data input terminal and a synchronization start signal from said central processing unit at its clear terminal and outputting the first synchronous signal to said data processing unit;

a second D flip-flop for receiving the synchronization detection signal at its clock terminal and the supply voltage at its data input terminal and outputting the second synchronous signal to said data processing unit;

a comparator for comparing the preamble from said shift register with that from said register and outputting the synchronization detection signal to said clock terminals of said first and second D flip-flops when they are the same; and an AND gate for ANDing a data start signal from said central processing unit and the synchronization start signal therefrom and outputting the ANDed result to a clear terminal of said second D flip-flop.

10. A digital wireless private branch exchange system as set forth in claim 1, wherein said intermediate frequency processing means includes:

an adder for adding data in the first frames from said channel control means;

a quadrature amplitude modulation circuit for performing a quadrature amplitude modulation operation for a transmission frame from said adder to produce a digital intermediate frequency signal;

a digital/analog converter for converting the digital intermediate frequency signal from said quadrature amplitude modulation circuit into an analog intermediate frequency signal and transferring the analog intermediate frequency signal to said radio frequency transmission/reception means; and an intermediate frequency distributor for receiving the analog intermediate frequency signal from said radio frequency transmission/reception means and distributing the received analog intermediate frequency signal to a corresponding one of said channel control means.

11. A digital wireless private branch exchange system as set forth in claim 3, wherein the voice data and preamble are alternately and repeatedly transferred in the unit of frame and the voice data and control data are then alternately and repeatedly transferred in the unit of frame.

12. A digital wireless private branch exchange system as set forth in claim 4, wherein said transmission control data processor includes:

a buffer for storing the control data from said central processing unit therein;

a register for storing the control data from said buffer in a parallel manner therein in response to a write control signal from said central processing unit and outputting the stored control data in a serial manner to said encoder/decoder circuit in response to a transmission clock signal;

an AND gate for ANDing a transmission data selection signal and a transmission preamble selection signal;

a counter for performing a counting operation in response to the first interrupt acknowledge signal from said central processing unit and the transmission clock signal to output the first interrupt signal to said central processing unit at a desired period; and a multiplexer for selecting one of the transmission data selection signal and an output signal from said AND gate in response to the transmission preamble signal and supplying the selected signal as the transmission clock signal to said register and said counter.

13. A digital wireless private branch exchange system as set forth in claim 4, wherein said data separator includes:

a counter for performing a counting operation in response to the reception clock signal from said encoder/decoder circuit to generate a plurality of clocks;

an inverter for inverting the reception clock signal from said encoder/decoder circuit;

a D flip-flop for generating the reception data selection signal in response to the second synchronous signal from said synchronization detector, a desired one of the clocks form said counter and the inverted reception clock signal from said inverter;

a first demultiplexer for separating the second frame from said encoder/decoder circuit into control data and voice data in response to the reception data selection signal from said D flip-flop; and a second demultiplexer for separating the reception clock signal from said encoder/decoder circuit into the voice data clock signal and the control data clock signal in response to the reception data selection signal from said D flip-flop.

14. A digital wireless private branch exchange system as set forth in claim 4, wherein said reception control data processor includes:

a register for transferring the control data from said data separator in response to the control data clock signal from said data separator;

a logic circuit including a plurality of AND gates and a OR gate, said logic circuit performing a logical operation for the control data from said register;

an inverter for inverting the reception data selection signal from said data separator;

a shift register for receiving control data from said logic circuit in a serial manner and outputting the received control data in a parallel manner in response to the inverted reception data selection signal from said inverter;

a buffer for supplying the control data from said shift register to said central processing unit;

a counter for performing a counting operation in response to the reception data selection signal from said data separator to generate a plurality of clocks; and a D flip-flop for generating the second interrupt signal in response to a desired one of the clocks from said counter and the second interrupt acknowledge signal from said central processing unit and outputting the generated second interrupt signal to said central processing unit.

* * * * *